US008270770B1

(12) United States Patent
Jin et al.

(10) Patent No.: US 8,270,770 B1
(45) Date of Patent: Sep. 18, 2012

(54) REGION-BASED DENSE FEATURE CORRESPONDENCE

(75) Inventors: Hailin Jin, San Jose, CA (US); Kai Ni, Atlanta, GA (US)

(73) Assignee: Adobe Systems Incorporated, San Jose, CA (US)

( * ) Notice: Subject to any disclaimer, the term of this patent is extended or adjusted under 35 U.S.C. 154(b) by 965 days.

(21) Appl. No.: 12/323,089

(22) Filed: Nov. 25, 2008

Related U.S. Application Data (60) Provisional application No. 61/089,379, filed on Aug. 15, 2008.

(51) Int. Cl.
*G06K 9/32* (2006.01)
*G06K 9/36* (2006.01)
(52) U.S. Cl. .................... 382/294; 382/285
(58) Field of Classification Search .......... 382/294, 382/285
See application file for complete search history.

(56) References Cited

U.S. PATENT DOCUMENTS

| | | | |
|---|---|---|---|
| 5,649,032 A * | 7/1997 | Burt et al. ................ | 382/284 |
| 6,097,854 A * | 8/2000 | Szeliski et al. ............ | 382/284 |
| 6,560,354 B1 * | 5/2003 | Maurer et al. ............. | 382/131 |
| 6,597,818 B2 * | 7/2003 | Kumar et al. .............. | 382/294 |
| 6,757,445 B1 * | 6/2004 | Knopp ...................... | 382/285 |
| 7,565,029 B2 * | 7/2009 | Zhou et al. ................ | 382/284 |
| 2005/0063608 A1 * | 3/2005 | Clarke et al. .............. | 382/284 |
| 2005/0117215 A1 * | 6/2005 | Lange ........................ | 359/462 |
| 2005/0244081 A1 * | 11/2005 | Zhou et al. ................ | 382/299 |
| 2007/0041658 A1 * | 2/2007 | Mishima et al. ............ | 382/278 |
| 2009/0154793 A1 * | 6/2009 | Shin et al. ................. | 382/154 |
| 2010/0232727 A1 * | 9/2010 | Engedal ..................... | 382/285 |

OTHER PUBLICATIONS

"Generalized RANSAC Framework for Relaxed Correspondence Problems," Wei Zhang; Kosecka, J.; Third International Symposium on 3D Data Processing, Visualization, and Transmission, 2006, pp. 854-860.*
A Robust Method for Airborne Video Registration Using Prediction Model, Yanxiong Wu; Xiling Luo; International Conference on Computer Science and Information Technology, 2008, pp. 518-523.*
Ondrej Chum and Jiri Matas, "Matching with PROSAC—Progressive Sample Consensus," Proceedings of the 2005 IEEE Computer Society Conference on Computer Vision and Pattern Recognition (CVPR'05), 2005, 7 pages.

* cited by examiner

*Primary Examiner* — Wenpeng Chen
(74) *Attorney, Agent, or Firm* — Robert C. Kowert; Meyertons, Hood, Kivlin, Kowert & Goetzel, P.C.

(57) ABSTRACT

In one embodiment, a method comprises determining an initial set of feature correspondences for a pair of images of a three dimensional (3D) space; identifying one or more first regions in one of the pair of images and one or more second regions in the other one of the pair of images. The method comprises identifying additional feature correspondences by matching first regions and second regions in the pair of images and generating a motion of a camera in the 3D space responsive to the initial set of feature correspondences and the additional feature correspondences, wherein the camera captured the images. Each of the first regions and the second regions potentially maps to a plane in the 3D space corresponding to the images. Additionally, each of the first regions and the second regions includes at least one feature in the initial set of feature correspondences.

26 Claims, 5 Drawing Sheets

REGION-BASED DENSE FEATURE CORRESPONDENCE

This application claims benefit of priority to U.S. Provisional Patent Application Ser. No. 61/089,379, filed on Aug. 15, 2008. The Provisional patent application is incorporated herein by reference. To the extent that anything in the Provisional patent application contradicts material expressly included herein, the material herein controls.

BACKGROUND

1. Field of the Invention

This invention is related to the field of image processing and, more particularly, to structure from motion mechanisms.

2. Description of the Related Art

Various image processing mechanisms involve feature matching between images. For example, for camera motion estimation and structure from motion mechanisms, feature matching between images captured by the same camera in motion in a three dimensional (3D) space can be used to estimate the motion of the camera as well as the structures in the 3D space. Generally, more feature matches between pairs of images permits more accurate estimation of the camera motion and structure. Additionally, more feature matches can increase the likelihood that camera motion estimation and structure estimation will be successful.

Typically, the criteria for detecting a match between features in a pair of images are fairly strong. That is, the features must match closely in order to be declared a feature correspondence. There are several reasons for implementing strong matching criteria. For example, some structures in images are repetitive (e.g. the windows on a building). Accordingly, features that correspond to the windows result in numerous matches between the images, many of which are false matches (outliers) because features from two different windows on the building are matched. Such matches are often discarded because many of the matches are incorrect. Additionally, lens distortion affects features that are nearer the edge of a given image, and the distortion can prevent detection of correct feature correspondences where the feature in one or both of the images is near the edge.

SUMMARY

In one embodiment, a method comprises determining an initial set of feature correspondences for a pair of images of a three dimensional (3D) space. The method further comprises identifying one or more first regions in one of the pair of images and one or more second regions in the other one of the pair of images. Each of the first regions and the second regions potentially maps to a plane in the 3D space corresponding to the images. Additionally, each of the first regions includes at least one feature in the one of the pair of images and each of the one or more second regions includes at least one feature in the other one of the pair images. The method comprises identifying additional feature correspondences by matching first regions and second regions in the pair of images and storing the feature correspondences and additional feature correspondences in a memory for later use. A computer accessible storage medium storing instructions which implement at least a portion of the method, and a corresponding computer system, are also contemplated embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these terms or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, other information storage devices, transmission devices, or display devices of the special purpose computer or similar special purpose electronic computing device.

Various embodiments of a method and apparatus for determining structure from motion are described. For example, the system may receive a set of images captured by a camera. From the images, the system may determine various camera motion parameters and various parameters for a 3D model of the objects in the images. The camera motion parameters may include, for example, camera rotations, focal lengths, 3D orientation, 3D translation (movement in 3D space), etc. The 3D model parameters may include the location, within a 3D space, of the various points from the images. Feature correspondences may be determined by applying feature matching among a set of images. The feature correspondences are relied on to estimate the camera motion parameters and 3D model parameters, and thus a larger number of correct (inlier) feature correspondences identified from the images may permit more rapid convergence on a solution and/or may permit a more accurate solution. On the other hand, typical feature correspondence detection is performed with a strong matching criteria to avoid the detection of large numbers of incorrect feature correspondences (outliers). That is, features in images may appear to be similar (and thus may be candidates to be declared correspondences) but may in fact be different features in the images. If too many such outliers are identified as feature correspondences, correctly identifying the camera parameters and/or 3D model parameters may be more computational intensive than desired and/or may not be possible.

Embodiments may perform any known feature matching algorithm to generate an initial set of feature correspondences. Additionally, embodiments may further implement a region-based mechanism for identifying additional correspondences which do not meet the strong matching criteria of the initial pass, but are located within a region with one or more initial feature correspondences and thus a higher degree of certainty may be inferred that the detected feature matches are inliers rather than outliers if the region maps to a plane in the 3D space. Once regions are identified in each image, the regions may be matched rather than individual features. Then, other feature correspondences may be found within the matching regions.

In this fashion, a larger number of feature correspondences may be detected. Furthermore, the feature correspondences identified via the region-based mechanism may be more likely to be inliers, in some embodiments. For example, features that are affected by lens distortion in one or both images, such as features near the boundary of the image, may be excluded from the initial matching because the distortion lowers the similarity of the features and thus the match may not meet the strong matching criteria. However, such feature correspondences may be identified via their inclusion in a region with feature correspondences that are initially identified. Similarly, common features that appear in an image multiple times (e.g. a feature on a window of a building that has many similar windows) may match many different instances of the feature in another image. In such cases, the initial feature matching mechanism may exclude the match. However, if some such features are included in a region, the matches may be detected between matching regions.

A region of an image may comprise any combination of two or more pixels from the image. For example, the region may be enclosed by a boundary that is determined in any desired fashion (e.g. user input, image segmentation algorithm, etc.). A region may have two or more distinct areas enclosed by separate boundaries as well.

Figure 1:
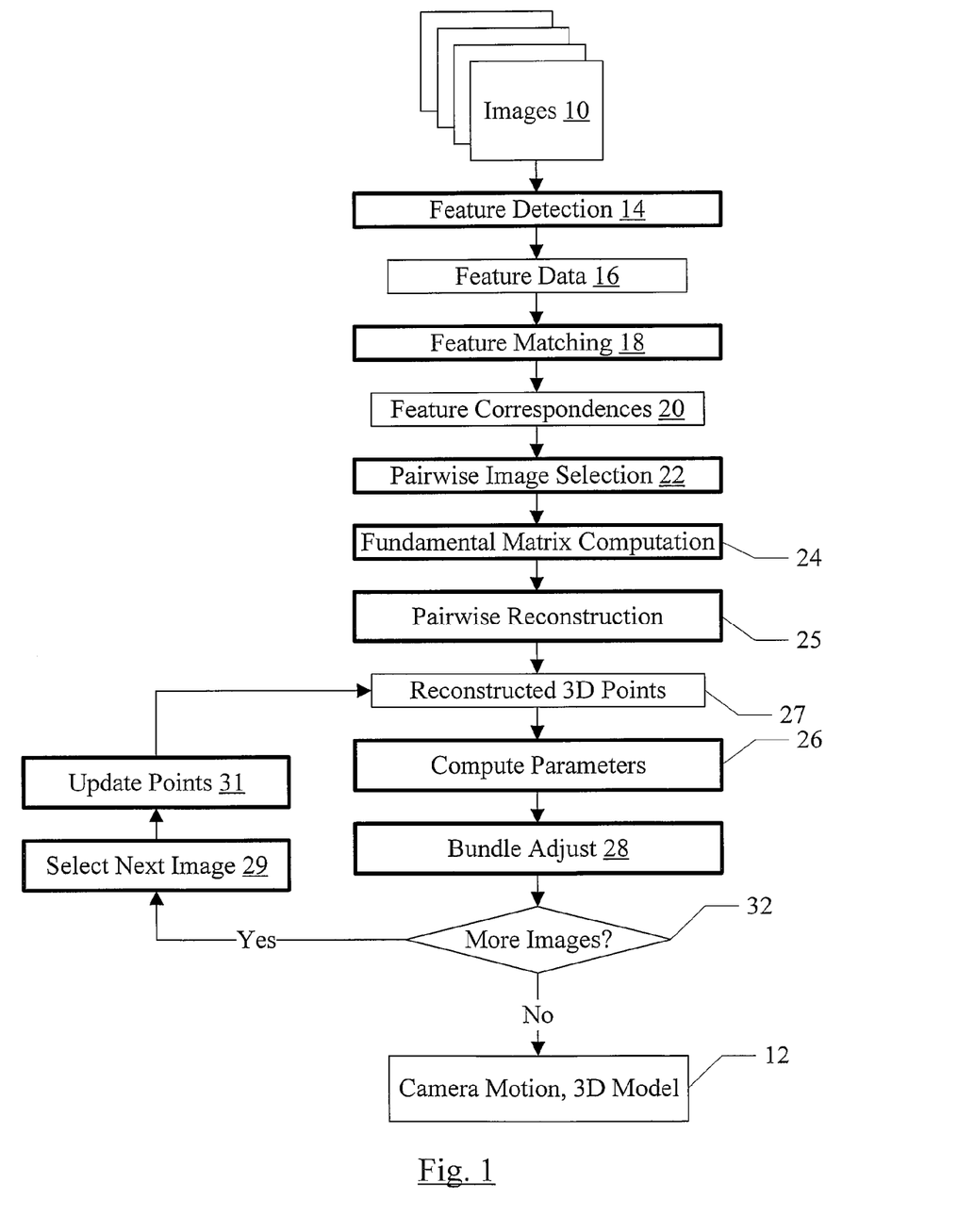
FIG. 1 illustrates an exemplary structure from motion system according to one embodiment.

FIG. 1 illustrates an exemplary structure from motion system that may employ the region-based dense feature correspondence mechanism described herein, in one embodiment. In FIG. 1, heavy line boxes indicate code segments or modules that implement portions of the structure from motion system, in one embodiment. Lighter line boxes illustrate data or data structures. In some embodiments, one or more of the modules and/or the system as a whole may be implemented in hardware and/or a combination of code and hardware. Each code segment or code module comprises a plurality of instructions which, when executed in a computer system or systems, may implement the operation described for the module.

A set of images 10 may be provided to the system, which may produce camera motion parameters, a 3D model of objects in the image, etc. (reference numeral 12). The images may be provided to the feature detection module 14, which may detect various features in the images. The detected features are described for each image in the feature data 16 as shown in FIG. 1. In general, features may comprise any identifiable structures in the image. For example, features may comprise one or more of points, lines, curves, surfaces, etc., in various embodiments. The feature matching module 18 may compare the feature data 16 for various pairs of images, and may generate feature correspondences 20 between the pairs of images. The feature correspondences may identify the images for which the correspondence is detected, as well as the location of the matched feature in each image. The feature correspondences 20 may further include other information regarding the features (e.g. color, data describing the gradient in the image near the features, etc.).

As mentioned above, in some embodiments, the initial set of feature correspondences may be augmented by forming regions in the images and attempting to match regions between images. For example, at least a pair of the images 10 may be segmented using various image segmentation algorithms. The system may count potential feature correspondences between regions in the two images. The system may employ Progress Sample Consensus (PROSAC) to find a projective transformation between the best matching region pairs. Topological information may be used to match remaining regions. In this manner, additional feature correspondences may be identified that may be missed in standard feature detection/feature matching mechanisms. Additional details will be provided below.

Once the feature correspondences have been detected, the system may attempt to identify the camera parameters and corresponding 3D model parameters for the images. In general, the camera parameters and 3D model parameters may be determined by optimizing the parameters together to minimize the reprojection errors of the matched features into the images. In one implementation, the compute parameters module 26 may attempt to find camera parameters and 3D model parameters based on the reconstructed 3D points mentioned above. The result may be optimized to minimize reprojection error in the bundle adjustment module 28.

The pairwise image selection module 22 may select a pair of images to initialize the reconstruction of camera parameters and 3D model parameters. The pair may include an image of interest from the images 10. The image of interest may be identified in any fashion. For example, user input may identify the image of interest. In another example, the image of interest may be automatically selected. The pairwise image selection module 22 may further select an additional image that has feature correspondences with the image of interest and has sufficient parallax with respect to the image of interest. For example, the image having the most feature correspondences with the image of interest may be selected. In yet other embodiments, the pair having the most feature correspondences may be selected, and one of the pair may be arbitrarily identified as the image of interest.

Based on the feature correspondences between the pair of images identified by the pairwise image selection module 22, the fundamental matrix computation module 24 may calculate the fundamental matrix for the image pair. The fundamental matrix may generally be a matrix that describes how corresponding points in one image are related to the other image, although there are uncertainties in the overall relationship since the camera motion parameters are not accurately known. Fundamental matrix calculation module 24 may calculate the fundamental matrix in any known fashion.

The fundamental matrix from the fundamental matrix computation module 24 and the feature correspondences 20 may be provided to the pairwise reconstruction module 25. The pairwise reconstruction module 25 may use this data to estimate the locations of the points from the matched features in 3D space ("reconstructed 3D points"). The estimates may be formed from the relative positions of the matching features within the respective images and the fundamental matrix. The pairwise reconstruction module 25 may initialize the reconstructed 3D points data structure 27 with the reconstructed 3D points from the initial image pair.

Generally, the compute parameters module 26 may attempt to recover the camera parameters corresponding to each additional image and the 3D points that are added by each additional image that is added to the images that have been processed. In the initial iteration, the reconstructed 3D points provided by the pairwise reconstruction module 25 may be used to recover the initial camera parameters and 3D points. Subsequently, the points added from the newly selected image (by the select next image module 29) may be recovered as well as additional camera parameters corresponding to the newly selected image.

The compute parameters module 26 may use the reconstructed 3D points to compute the camera motion parameters and 3D model parameters. Specifically, in one embodiment, the compute parameters module 26 may group the 3D reconstructed points into natural groups. For example, the points corresponding to a given image of interest may be grouped based on which other images the points are detected in. A given point may be detected in more that one other image, and may be included in the groups for each other image in which they are detected. The compute parameters module 26 may score the groups based on the likelihood that the feature correspondences are inliers. The compute parameters module 26 may initially provide points for sampling by a consensus estimator such as RANSAC and/or its variants from the highest scoring group or groups, and may gradually permit sampling of points from lower scoring groups as the estimator iterates. Randomness may generally be maintained, but the sampling has been biased toward the groups viewed as most likely to include inliers (that is, from the groups with the highest scores). Thus, the consensus estimator may rapidly converge on a solution, in some embodiments. The verification of the proposed model generated by an iteration of the consensus estimator may still be performed over the full set of reconstructed 3D points 27 (i.e. including those points that are not in the groups from which sampling is performed).

Upon completion of the compute parameters module 26, the system may perform bundle adjustment on the result to refine the camera parameters and 3D model by minimizing the reprojection error in the bundle adjustment module 28. In some embodiments, any bundle adjustment algorithm may be used. The bundle adjustment algorithm is typically a non-linear algorithm. For example, the Levenberg-Marquardt algorithm may be used in one embodiment, although any algorithm may be used in other embodiments. Generally, non-linear algorithms require computational effort that increases non-linearly with respect to the number of points input to the algorithm. For example, the Levenberg-Marquardt algorithm may scale quadratically with the number of points. It is possible to use all points in some embodiments, and all points may be used in some embodiments. In other embodiments, the bundle adjustment module may attempt to quantify the contribution of each point to each parameter being determined by the system (e.g. camera motion parameters and 3D model parameters). Points with the highest contribution may be selected and the contribution of the remaining points may be updated. Once enough points have been selected to constrain the desired parameters at a given threshold of accuracy, the non-linear algorithm maybe executed over the selected points. Optionally, additional points may be selected to further improve the accuracy of the solution.

The compute parameters module 26 and the bundle adjustment module 28 may thus complete the first iteration of camera motion parameter estimation and 3D model parameter estimation based on the initial image pair. Additional iterations may the be performed based on additional images in the set of images 10. If there are still more images to process (decision block 32, "yes" leg), a select next image module 29 may select another image. For example, the image having the next highest number of feature correspondences with the image of interest (or with another image that has already been processed) may be selected. The update points module 31 may update the reconstructed 3D points with additional points derived from the selected image, and the modules 26 and 28 may be iterated again. Each iteration may further refine the parameter estimates. If there are no more images to process (decision block 32, "no" leg), the structure from motion system may store the camera motion parameters and 3D model parameters (reference numeral 12).

While FIG. 1 illustrates that the bundle adjustment module 28 executes on each iteration (for each image), some embodiments may only execute the bundle adjustment module 28 every "N" iterations of the loop (e.g. after every N new images have been processed). "N" may generally be a positive integer (e.g. 5, 10, etc.).

The modules 22, 24, 26, and 28 may be iterated for other images of interest to determine additional camera motion and 3D model parameters for the result 12. Alternatively, the system may operate in parallel on different images of interest (e.g. on different computer systems in a distributed computing platform). Still further, the system may operate in parallel based on different images of interest, and the results from the parallel operations may be merged at some point. For example, user input may determine when the parallel operations are to be merged, or the system may select the merge point automatically. The merge point may be selected at any time after at least one common image has been processed in the parallel operations, in various embodiments.

Figure 2:
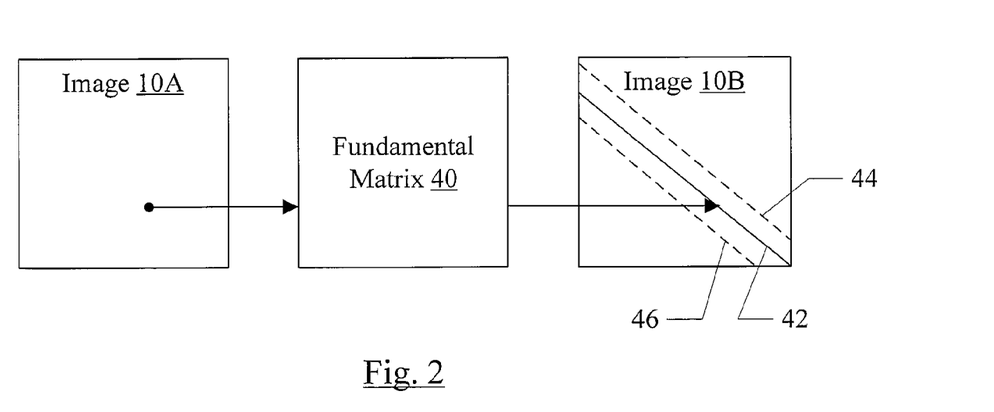
FIG. 2 is a block diagram illustrating a translation from a point in one image to a potential correspondence in another image according to a fundamental matrix.

Turning now to FIG. 2, a block diagram illustrating the mapping of a point in one of the images 10A to a potential correspondence in another image 10B via a fundamental matrix 40 is shown. As illustrated, a point in one image is mapped to a line (reference numeral 42) in the other image. That is, the corresponding point may be anywhere along the line 42 in the other image. The mapping of a point to a line (also known as an epipolar constraint) is due to the uncertainty of the estimates of the 3D space and the unknowns of the camera motion parameters. Additionally, because of noise, distortion, etc., an area around the line (indicated by dotted lines 44 and 46 in FIG. 2) may actually contain the corresponding point. Accordingly, the band bounded by dotted lines 44 and 46 may contain potential correspondences.

Figure 3:
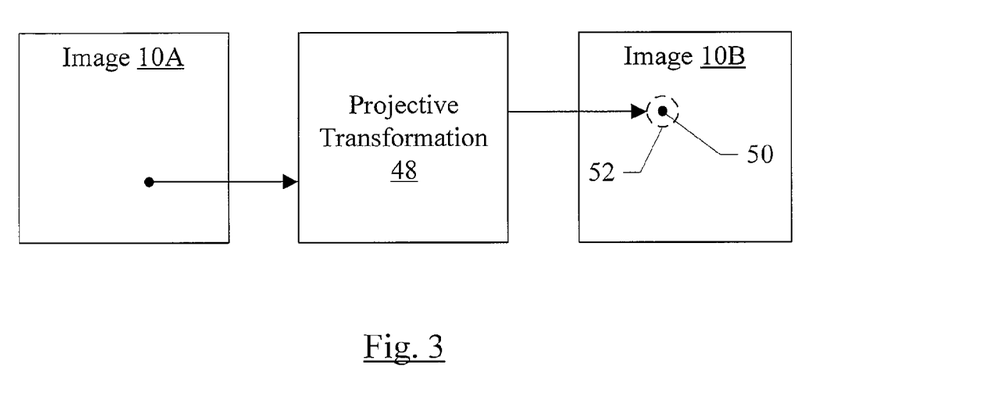
FIG. 3 is a block diagram illustrating a translation from a point in one image to a potential correspondence in another image according to protective transformation.

FIG. 3 is a block diagram illustrating the mapping of a point from the image 10A to a potential correspondence in the image 10B through a projective transformation 48. In the projective transformation 48, the point maps to a corresponding point 50 (rather than a line). With various uncertainties, the line may be a disk 52. However, the potential mapping area is significantly smaller than the mapping provided through the fundamental matrix 40. As can be seen comparing FIGS. 2 and 3, the mapping via projective transformation is more accurate than the mapping via the fundamental matrix 40/epipolar constraint.

Generally, when determining feature correspondences between images, only the fundamental matrix 40 is available (or may be roughly estimated). However, if a plane exists in the 3D space that is captured by the images, the transformation of the plane between images is projective. Accordingly, if a region is identifiable in an image and the region maps to a plane in the 3D space, and if the region can be matched to a region in the other image that also maps to the plane, it may be possible to determine a projective transformation from one image to another for that region. Additional feature correspondences may be found in this fashion within the plane.

In one embodiment, the structure from motion system may attempt to define regions in images that may correspond to planes in the 3D space captured by the images. The regions may be matched between the images, and then a sample consensus algorithm such as RANSAC (Random Sample Consensus) or any of its variations may be used to recover the corresponding projective transformation. Specifically, PROSAC (Progress Sample Consensus) may be used, in one embodiment. If a projective transformation is successfully recovered, other region pairs may be checked against the projective transformation to determine if they are consistent with the projective transformation. Other region pairs that are found to be consistent may be merged with the original regions.

Figure 4:
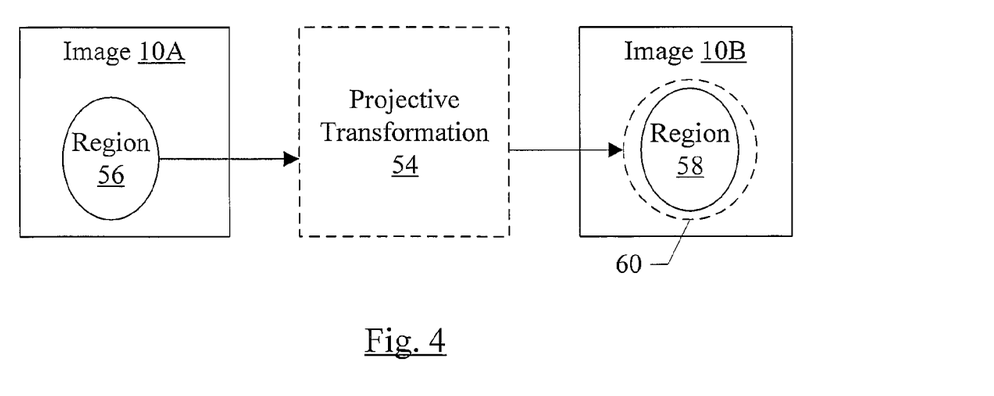
FIG. 4 is a block diagram illustrating a translation from a region in one image to a potential correspondence region in another image according to protective transformation.

FIG. 4 is a block diagram illustrating one embodiment of a region 56 in image 10A that is mapped through a projective transformation 54 to a region 58 in the image 10B (with some uncertainty illustrated by the dotted enclosure 60). While the regions are illustrated as ovals in FIG. 4, the regions may be defined to have arbitrary shape, in various embodiments. The regions in each image may not have the same shape, either, since the regions are the projections of the plane in 3D space onto the two images 10A-10B. The farther that camera moves between the images 10A-10B, the more that the regions in the images 10A-10B may differ from each other in shape. The projective transformation 54 is shown in FIG. 4 as a dotted enclosure to indicate that the projective transformation 54 that relates the regions 56 and 58 is unknown when the regions are matched, and may be recovered by performing the PROSAC algorithm from the matched regions 56 and 58. Recovering the projective transformation 54 may be an indication that the regions 56 and 58 possibly match and are mapped to the same plane in 3D space.

Figure 5:
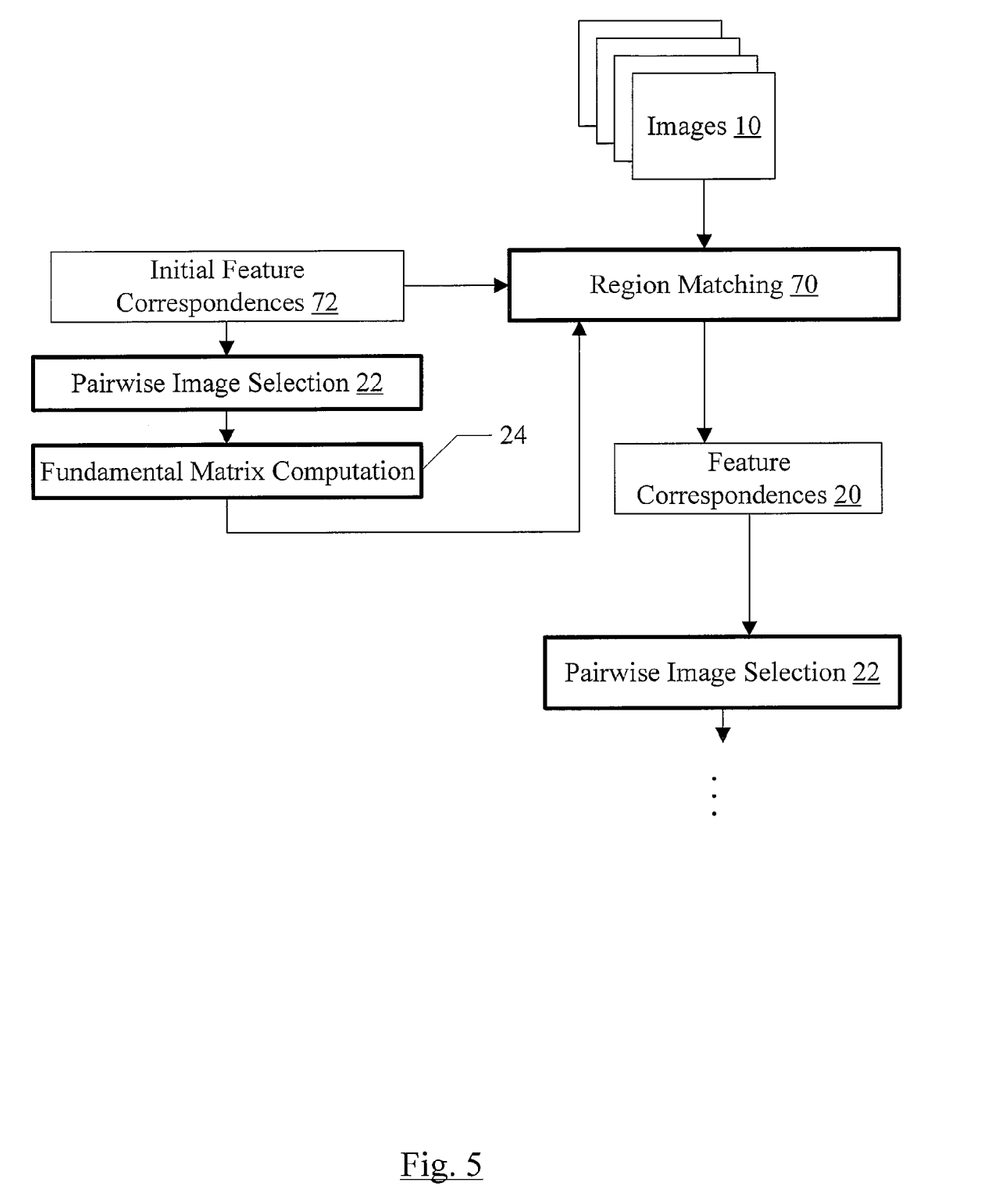
FIG. 5 illustrates a more detailed exemplary structure from motion system according to one embodiment.

Turning now to FIG. 5, a diagram illustrating one embodiment of a portion of the structure from motion system from FIG. 1 that implements the region matching scheme is shown. The portion shown in FIG. 5 may, for example, be part of the feature matching module 18 in FIG. 1.

The feature matching module 18 may generate an initial set of feature correspondences 72, using any desired feature matching techniques. The feature matching module 18 may invoke the pairwise image selection module 22 to select a pair of images based on the initial feature correspondences 72, and may invoke the fundamental matrix computation module 24 to calculate a rough estimate of the fundamental matrix for the selected pair. Alternatively, the feature matching module 18 may implement operation similar to the pairwise image selection module 22 and the fundamental matrix computation module 24 to generate a rough estimate of the fundamental matrix.

A region matching module 70 may receive the fundamental matrix, the initial feature correspondences 72, and the images 10. The region matching module 70 may attempt to define regions in the images that are likely to match a planar section of the 3D model, to match regions between the images, and to generate additional feature correspondences based on the matched images. The resulting additional feature correspondences and the initial feature correspondences 72 may form the feature correspondences 20 provided to the pairwise image selection module 22 as illustrated in FIG. 1.

Figure 6:
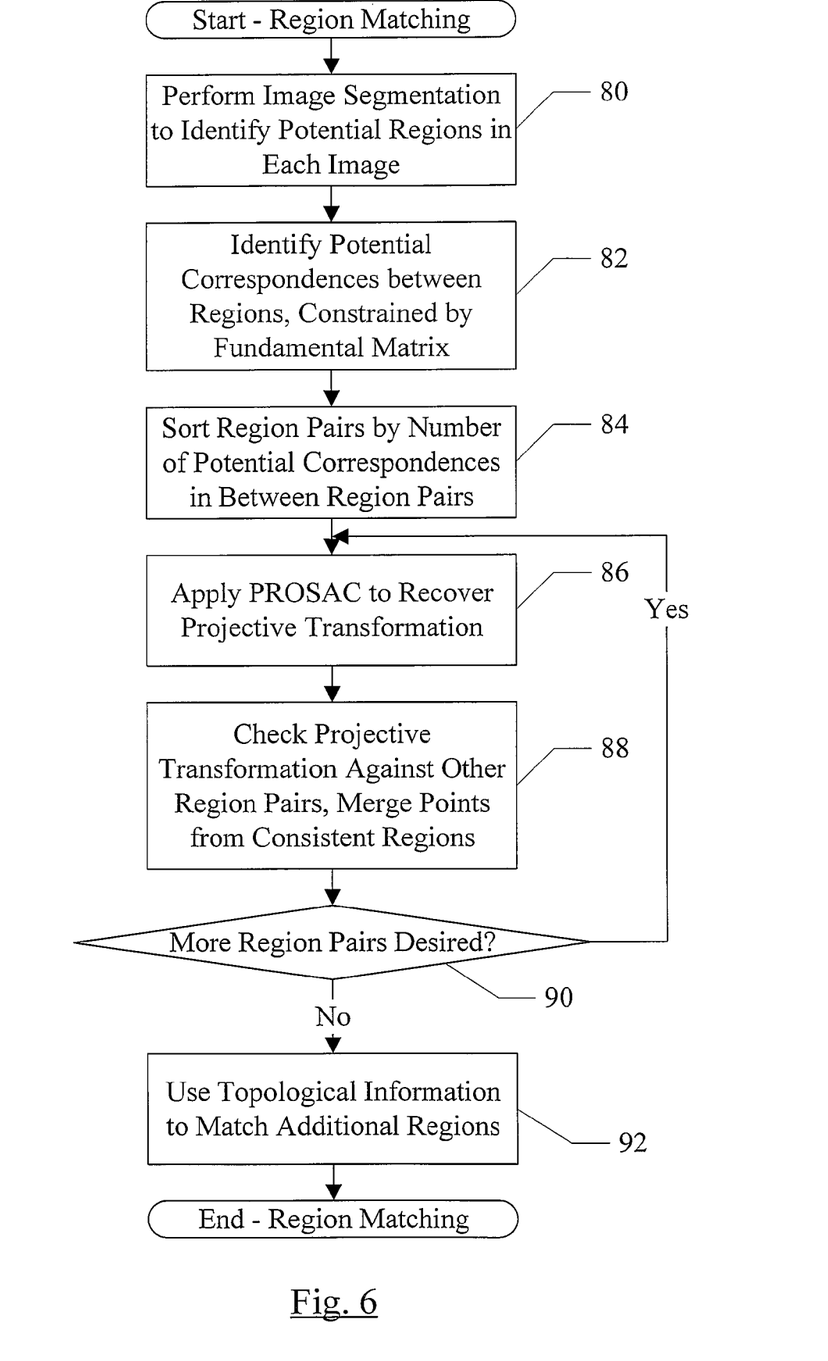
FIG. 6 is a flowchart illustrating a portion of one embodiment of a region matching module shown in FIG. 5.

Turning now to FIG. 6, a flowchart is shown illustrating at least a portion of the operation of the region matching module 70. While the blocks are shown in a particular order for ease of understanding, other orders may be used. In one embodiment, the region matching module 70 may comprise instructions which, when executed on a computer system or system, implement the operation of the flowchart shown in FIG. 6.

The region matching module 70 may perform image segmentation on the pair of images to identify potential regions in the images (block 80). Any form of image segmentation may be used in various embodiments. For example, color segmentation may be used. A region of an image having pixels of the same color may have a reasonable likelihood of mapping to a planar (or nearly planar) surface in the 3D space. Other embodiments may attempt to recognize objects in the image. User input may be used to identify potential regions. Any combination of two or more image segmentation mechanisms may be used in some embodiments.

The region matching module 70 may identify potential correspondences between the regions in one image and the regions in the other image based on the initial correspondences 72 and under the constraint of the fundamental matrix (block 82). That is, if a feature in a region in one image has a potential correspondence in a region of the other image (e.g. along the line 42 in FIG. 2), the potential correspondence may be counted between the two regions. The region matching module 70 may the sort the potential region pairs by the count of the number of potential feature matches between each pair. Thus, the sorted region pairs may be in order from highest count to lowest count (block 84).

The region matching module 70 may apply PROSAC (or any other consensus estimator, such as other variants of RANSAC) to the sorted region pairs, and attempt to recover the projective transformation 54 that provides the most inlier correspondences. The recovered projective transformation 54 may be constrained to be consistent with the fundamental matrix. Because the fundamental matrix is available, three point correspondences may be sampled by PROSAC for the analysis (block 86). The region matching module 70 may then check the recovered projective transformation 54 against other ones of the sorted region pairs (block 88). If a region pair is consistent with the recovered projective transformation (at least within a threshold), then the region pair may be part of the same plane in the 3D space. The region pair may be removed, and its points may be merged into the matching region pair from which the recovered projective transformation 54 was generated.

The region matching module 70 may determine if more region pair matches and projective transformation recoveries are desired (decision block 90). The decision may depend on a variety of factors, in various embodiments. For example, if there are remaining region pairs having relatively high counts of potential correspondences, there may be another plane (and another corresponding projective transformation to be recovered) in the 3D space. In an embodiment, the residue may be calculated for the recovered projective transformation 54, and if the residue is high enough, no more region pairs need be processed. Any factor or combination of factors may be used to determine if additional region pair iterations are desired. If more region pair matches are desired (decision block 90, "yes" leg), the region matching module 70 may iterate the invoking of the PROSAC process (block 86) and the checking of the recovered projective transformation 54 (block 88).

Once enough region pair matches and recovered projective transformations have been determined (decision block 90, "no" leg), the region matching module 70 may use topological information to match additional regions not previously processed (block 92). For example, if a given region is surrounded (or partially surrounded) by regions that have been matched, the given region may be matched to a corresponding area in the other image that is surrounded (or partially surrounded) by regions that have been matched. Alternatively, other feature matching algorithms may be used, and the matching criteria may be gradually loosened. In yet another alternative, the fundamental matrix may be used instead of the projective transformation to avoid failures in non-planar regions. It may also be beneficial to recompute the fundamental matrix for corner regions of an image, to account for lens distortion near the edges. Other embodiments may implement combinations of two or more of the above mechanisms and/or other mechanisms. Still further, the fundamental matrix may be recomputed using the additional correspondences identified by the region matching module 70. The region matching module 70 may write the resulting feature correspondences and the initial feature correspondences 72 to the feature correspondences structure 20.

Exemplary System

Figure 7:
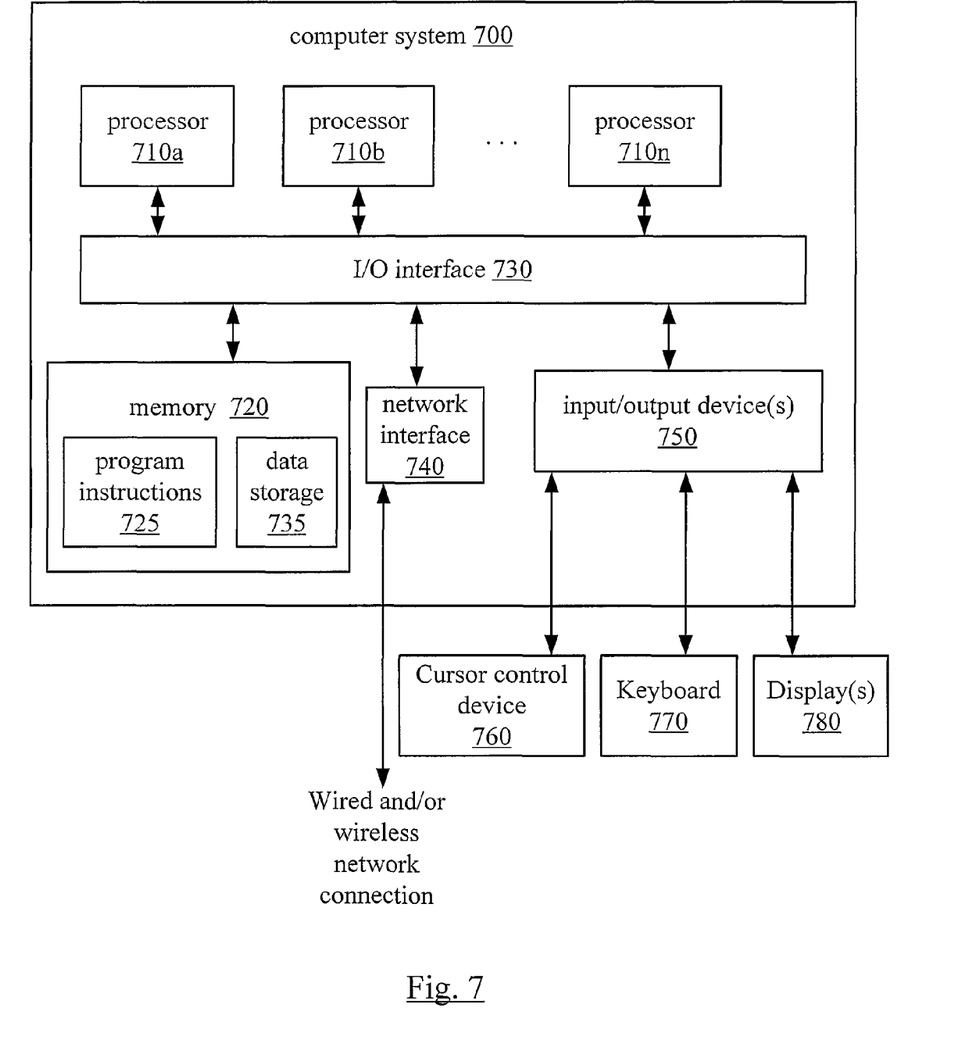
FIG. 7 illustrates an exemplary computer system that may be used in embodiments.

Various components of embodiments of a method and apparatus for region matching and other uses may be executed on one or more computer systems, which may interact with various other devices. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired operations, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement embodiments of a method and apparatus described above, and data storage 735, comprising various data accessible by program instructions 725. In one embodiment, program instructions 725 may include software elements of a method and apparatus described above. Data storage 735 may include data that may be used in embodiments. In other embodiments, other or different software elements and data may be included.

In some embodiments, the computer system 700 may also include a graphics processing unit (GPU). The GPU may be optimized for graphics processing (e.g. for generating images to be displayed on a display screen connected to the computer system 700). The GPU may be programmable with program instructions according to the instruction set implemented by the GPU (e.g. instruction sets developed by graphics manufacturers such as NVIDIA or ATI). In some embodiments, the GPU may have a private, dedicated memory accessible only to the GPU. The program instructions may be stored in the private memory, in one embodiment. In one embodiment, the GPU may execute program instructions to implement some or all of the method describe herein.

Those skilled in the art will appreciate that computer system 700 is merely illustrative and is not intended to limit the scope of a method and apparatus as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

The various methods as illustrated in the drawings and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   applying a feature matching technique to a pair of images to determine an initial set of feature correspondences for the pair of images, wherein one or more features of the pair of images are not matched by the feature matching technique and are thus not included in the initial set of feature correspondences;
   determining additional feature correspondences for the pair of images among the one or more features not included in the initial set of feature correspondences, wherein said determining additional feature correspondences comprises:
      identifying two or more regions in each of the pair of images, each of the regions potentially mapping to a plane in a 3D space corresponding to the images, and each of the regions including at least one feature in the respective image;
      identifying matching region pairs between the pair of images; and
      identifying the additional feature correspondences in the matching region pairs; and
   storing the initial set of feature correspondences and the additional feature correspondences in a memory for later use.

2. The method as recited in claim 1 further comprising:
   generating a motion of a camera in the 3D space responsive to the initial set of feature correspondences and the additional feature correspondences.

3. The method as recited in claim 2 further comprising:
   generating a 3D model of the 3D space responsive to the initial set of feature correspondences and the additional feature correspondences.

4. The method as recited in claim 1 wherein identifying two or more regions in each of the pair of images comprises performing image segmentation on each of the pair of images.

5. The method as recited in claim 4 wherein the image segmentation comprises color segmentation.

6. The method as recited in claim 1 wherein identifying two or more regions in each of the pair of images comprises performing object recognition on each of the pair of images to identify one or more objects in the pair of images.

7. The method as recited in claim 1 wherein identifying two or more regions in each of the pair of images comprises accepting user input identifying the regions.

8. The method as recited in claim 1 wherein identifying matching region pairs between the pair of images comprises:
   counting potential feature correspondences within potentially matching region pairs; and
   applying a consensus estimator to at least one region pair having the highest number of potential feature correspondences to recover a projective transformation from one of the regions in the pair to the other region in the pair.

9. The method as recited in claim 8 wherein identifying matching region pairs between the pair of images further comprises:
   applying the projective transformation to other potentially matching region pairs; and
   merging regions from region pairs that are consistent with the projective transformation, within a threshold, into the first region and second region.

10. The method as recited in claim 8 wherein a successful recovery of the projective transformation is indicative that the respective regions match.

11. The method as recited in claim 8 wherein identifying matching region pairs between the pair of images further comprises:
   iteratively applying the consensus estimator to other potential region pairs; and
   using topological information related to the matched region pairs to identify one or more additional potentially matching region pairs among the unmatched first regions and second regions.

12. A non-transitory computer accessible storage medium storing a plurality of instructions which, when executed:
   obtain an initial set of feature correspondences for a pair of images, wherein the initial set of feature correspondences were determined according to a feature matching technique, and wherein one or more features of the pair of images are not matched by the feature matching technique and are thus not included in the initial set of feature correspondences;
   determine additional feature correspondences for the pair of images among the one or more features not included in the initial set of feature correspondences, wherein, to determine additional feature correspondences, the plurality of instructions which, when executed:
      identify two or more regions in each of the pair of images, each of the regions potentially mapping to a plane in a 3D space corresponding to the images, and each of the regions including at least one feature in the respective image;
      identify matching region pairs between the pair of images; and
      identify the additional feature correspondences in the matching region pairs; and
   store the initial set of feature correspondences and the additional feature correspondences for later use.

13. The non-transitory computer accessible storage medium as recited in claim 12 wherein the plurality of instructions which, when executed, identify two or more regions in each of the pair of images comprise instructions which, when executed, perform image segmentation on each of the pair of images.

14. The non-transitory computer accessible storage medium as recited in claim 13 wherein the image segmentation comprises color segmentation.

15. The non-transitory computer accessible storage medium as recited in claim 12 wherein the plurality of instructions which, when executed, identify two or more regions in each of the pair of images comprise instructions which, when executed, perform object recognition on each of the pair of images to identify one or more objects in the pair of images.

16. The non-transitory computer accessible storage medium as recited in claim 12 wherein the plurality of instructions which, when executed, identify two or more regions in each of the pair of images comprise instructions which, when executed, accept user input identifying the regions.

17. The non-transitory computer accessible storage medium as recited in claim 12 wherein the plurality of instructions which, when executed, identify matching region pairs between the pair of images comprise instructions which, when executed:
   count potential feature correspondences within potentially matching region pairs; and
   apply a consensus estimator to at least one region pair having the highest number of potential feature correspondences to recover a projective transformation from one of the regions in the pair to the other region in the pair.

18. The non-transitory computer accessible storage medium as recited in claim 17 wherein the plurality of instructions which, when executed, identify matching region pairs between the pair of images comprise instructions which, when executed:
   apply the projective transformation to other potentially matching region pairs; and
   merge regions from region pairs that are consistent with the projective transformation, within a threshold, into the first region and second region.

19. The non-transitory computer accessible storage medium as recited in claim 18 wherein a successful recovery of the projective transformation is indicative that the respective regions match.

20. The non-transitory computer accessible storage medium as recited in claim 18 wherein the plurality of instructions which, when executed, identify matching region pairs between the pair of images comprise instructions which, when executed:
   iteratively apply the consensus estimator to other potential region pairs; and
   use topological information related to the matched region pairs to identify one or more additional potentially matching region pairs among the unmatched first regions and second regions.

21. A computer system, comprising:
   at least one processor configured to execute instructions; and
   a memory coupled to the processor, the memory storing a plurality of instructions which, when executed by the at least one processor:
      obtain an initial set of feature correspondences for a pair of images, wherein the initial set of feature correspondences were determined according to a feature matching technique, and wherein one or more features of the pair of images are not matched by the feature matching technique and are thus not included in the initial set of feature correspondences;
      determine additional feature correspondences for the pair of images among the one or more features not included in the initial set of feature correspondences, wherein, to determine additional feature correspondences, the plurality of instructions which, when executed:
- identify two or more regions in each of the pair of images, each of the regions potentially mapping to a plane in a 3D space corresponding to the images, and each of the regions including at least one feature in the other respective image;
- identify matching region pairs between the pair of images; and
- identify the additional feature correspondences in the matching region pairs; and
- store the initial set of feature correspondences and the additional feature correspondences in the memory for later use.

22. The computer system as recited in claim 21 wherein the plurality of instructions which, when executed, identify matching region pairs between the pair of images comprise instructions which, when executed:
- count potential feature correspondences within potentially matching region pairs; and
- apply a consensus estimator to at least one region pair having the highest number of potential feature correspondences to recover a projective transformation from one of the regions in the pair to the other region in the pair.

23. The computer system as recited in claim 22 wherein the plurality of instructions which, when executed, identify matching region pairs between the pair of images comprise instructions which, when executed:
- apply the projective transformation to other potentially matching region pairs; and
- merge regions from region pairs that are consistent with the projective transformation, within a threshold, into the first region and second region.

24. The computer system as recited in claim 23 wherein a successful recovery of the projective transformation is indicative that the respective regions match.

25. The computer system as recited in claim 23 wherein the plurality of instructions which, when executed, identify matching region pairs between the pair of images comprise instructions which, when executed:
- iteratively apply the consensus estimator to other potential region pairs; and
- use topological information related to the matched region pairs to identify one or more additional potentially matching region pairs among the unmatched first regions and second regions.

26. A computer-implemented method, comprising:
- executing instructions on a specific apparatus so that binary digital electronic signals representing an initial set of feature correspondences for a pair of images of a three dimensional (3D) space are determined according to a feature matching technique, wherein one or more features of the pair of images are not matched by the feature matching technique and are thus not included in the initial set of feature correspondences;
- executing instructions on the specific apparatus so that binary digital electronic signals representing additional feature correspondences for the pair of images are determined from among the one or more features not included in the initial set of feature correspondences, wherein, to determine the additional feature correspondences, said instructions perform:
  - identifying two or more regions in each of the pair of images, each of the regions potentially mapping to a plane in a 3D space corresponding to the images, and each of the regions including at least one feature in the respective image;
  - identifying matching region pairs between the pair of images; and
  - identifying the additional feature correspondences in the matching region pairs; and
- storing data representing the initial set of feature correspondences and the additional feature correspondences in a memory location of the specific apparatus.

* * * * *